(12) United States Patent
Moyer et al.

(10) Patent No.: US 7,117,346 B2
(45) Date of Patent: Oct. 3, 2006

(54) DATA PROCESSING SYSTEM HAVING MULTIPLE REGISTER CONTEXTS AND METHOD THEREFOR

(75) Inventors: William C. Moyer, Dripping Springs, TX (US); John H. Arends, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 510 days.

(21) Appl. No.: 10/159,386

(22) Filed: May 31, 2002

(65) Prior Publication Data

US 2003/0226001 A1    Dec. 4, 2003

(51) Int. Cl.
*G06F 12/00* (2006.01)

(52) U.S. Cl. ............... 712/228; 712/244; 712/217

(58) Field of Classification Search ........ 712/228, 712/244, 217
See application file for complete search history.

(56) References Cited

U.S. PATENT DOCUMENTS

| | | | |
|---|---|---|---|
| 5,386,563 A * | 1/1995 | Thomas | 712/228 |
| 5,426,766 A * | 6/1995 | Ogata | 711/5 |
| 5,680,599 A * | 10/1997 | Jaggar | 712/244 |
| 5,812,868 A | 9/1998 | Moyer et al. | |
| 6,029,242 A | 2/2000 | Sidman et al. | |
| 6,134,578 A | 10/2000 | Ehlig et al. | |
| 6,145,049 A | 11/2000 | Wong | |
| 6,154,832 A | 11/2000 | Maupin | |
| 6,170,997 B1 | 1/2001 | Glew et al. | |
| 2002/0002667 A1 | 1/2002 | Kelsey et al. | |

FOREIGN PATENT DOCUMENTS

WO    WO 00/79394 A1    12/2000

OTHER PUBLICATIONS

Kogge, Peter M. et al.; "PIM Architectures to Support Petaflops Level Computation in the HTMT Machine"; 2000; pp. 35-44; IEEE.
Nuth, Peter R. et al.; "The Named-State Register File: Implementation and Performance"; 1995; pp. 4-13; IEEE.
Konuru, Ravi et al.; "A User-Level Process Package for PVM"; 1994; pp. 48-55; IEEE.

* cited by examiner

*Primary Examiner*—Richard L. Ellis
*Assistant Examiner*—Ryan Fiegle
(74) *Attorney, Agent, or Firm*—Joanna G. Chiu

(57) ABSTRACT

A data processing system having multiple register contexts is described. One embodiment of the present invention uses a user programmable context control register for each of the multiple register contexts to allow for the mapping of portions of an alternate register context into a current register context. The context control register may also be used to provide for the sharing of common stack pointers among multiple register contexts. Therefore, when operating in a current register context, the context control register may be used to access portions of an alternate register context in place of accessing corresponding portions of the current register context.

21 Claims, 6 Drawing Sheets

DATA PROCESSING SYSTEM HAVING MULTIPLE REGISTER CONTEXTS AND METHOD THEREFOR

FIELD OF THE INVENTION

The present invention relates generally to a data processing system, and more specifically, to a data processing system having multiple register contexts.

RELATED ART

In data processing systems, such as microprocessors, a processor is utilized to control execution and processing of operations. The processor includes registers which store a register context which is utilized by the processor during normal operation and exception processing. When an interrupt or process switch occurs, the register context information may be corrupted because the interrupt processing program or the new process will use the same registers and may change some of the values therein.

One solution to the above mentioned problem is to save the current values of the register context in a memory prior to beginning the processing of the interrupt or the new process, and reading the saved register context values back into the registers from the memory when the interrupt processing is complete or when returning back to the current process. However, the overhead of saving the register context, and loading a new context is undesirable in a real-time or high-performance environment. Therefore, a need exists for a register context selection scheme in a data processing system which is flexible and reduces overhead.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The terms "assert" and "negate" (or "deassert") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one. The symbol "$" preceding a number indicates that the number is represented in its hexadecimal or base sixteen form. The symbol "%" preceding a number indicates that the number is represented in its binary or base two form.

Figure 1:
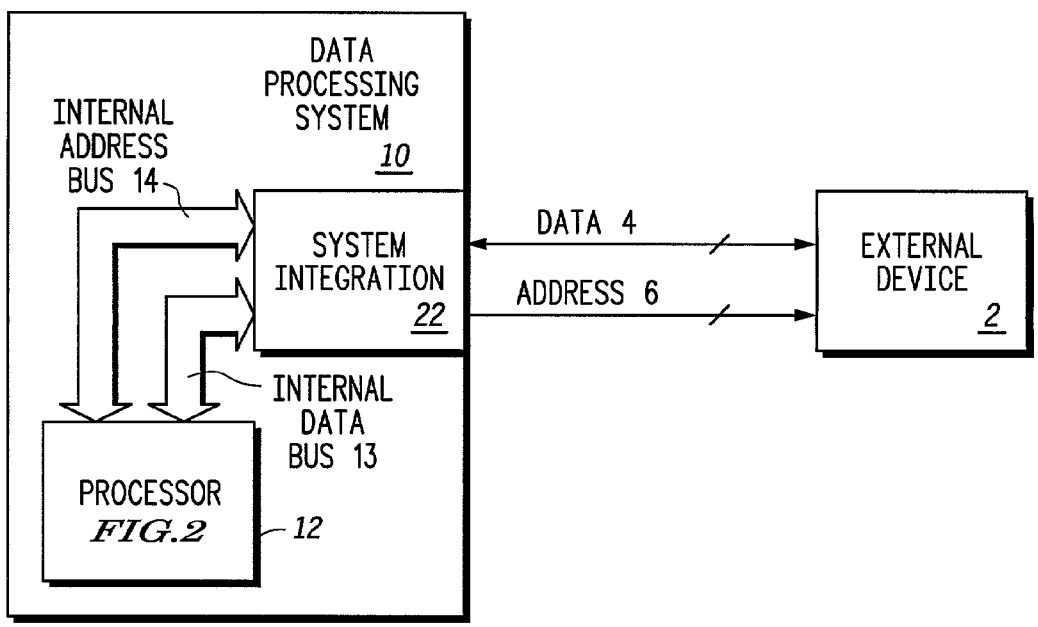
FIG. 1 illustrates, in block diagram form, a data processing system in accordance with one embodiment of the present invention.

FIG. 1 illustrates a data processing system 10 coupled to an external device 2 via a data bus 4 and an address bus 6. Data processing system 10 includes a processor 12. In one embodiment, data processing system 10 and external device 2 are each implemented as separate integrated circuits. In alternate embodiments, data processing system 10 and external device 2 can be implemented on a single integrated circuit. Within data processing system 10, processor 12 is coupled to system integration circuit 22 by an internal data bus 13 and internal address bus 14.

Note that in some embodiments of the present invention, data processing system 10 is formed on a single integrated circuit. Additionally, in some embodiments, data processing system 10 may be a single chip microcontroller, a microprocessor, a digital signal processor, or any other type of data processing system. Furthermore, data processing system 10 may be implemented using any type of electrical circuitry. External device 2 may be any type of electrical circuit, including a memory or any type of peripheral device. Alternate embodiments may include more, fewer, or different external integrated circuits. In addition buses 4 and 6 can be implemented using any number of bits.

In operation, system integration 22 is used to allow communication between processor 12 and external device 2. That is, processor 12 passes data and address information via internal buses 14 and 13 to system integration 22 which then passes the data and address information via buses 4 and 6 in a method and format appropriate for external device 2. Processor 12 will be discussed in more detail below in reference to FIG. 2.

Figure 2:
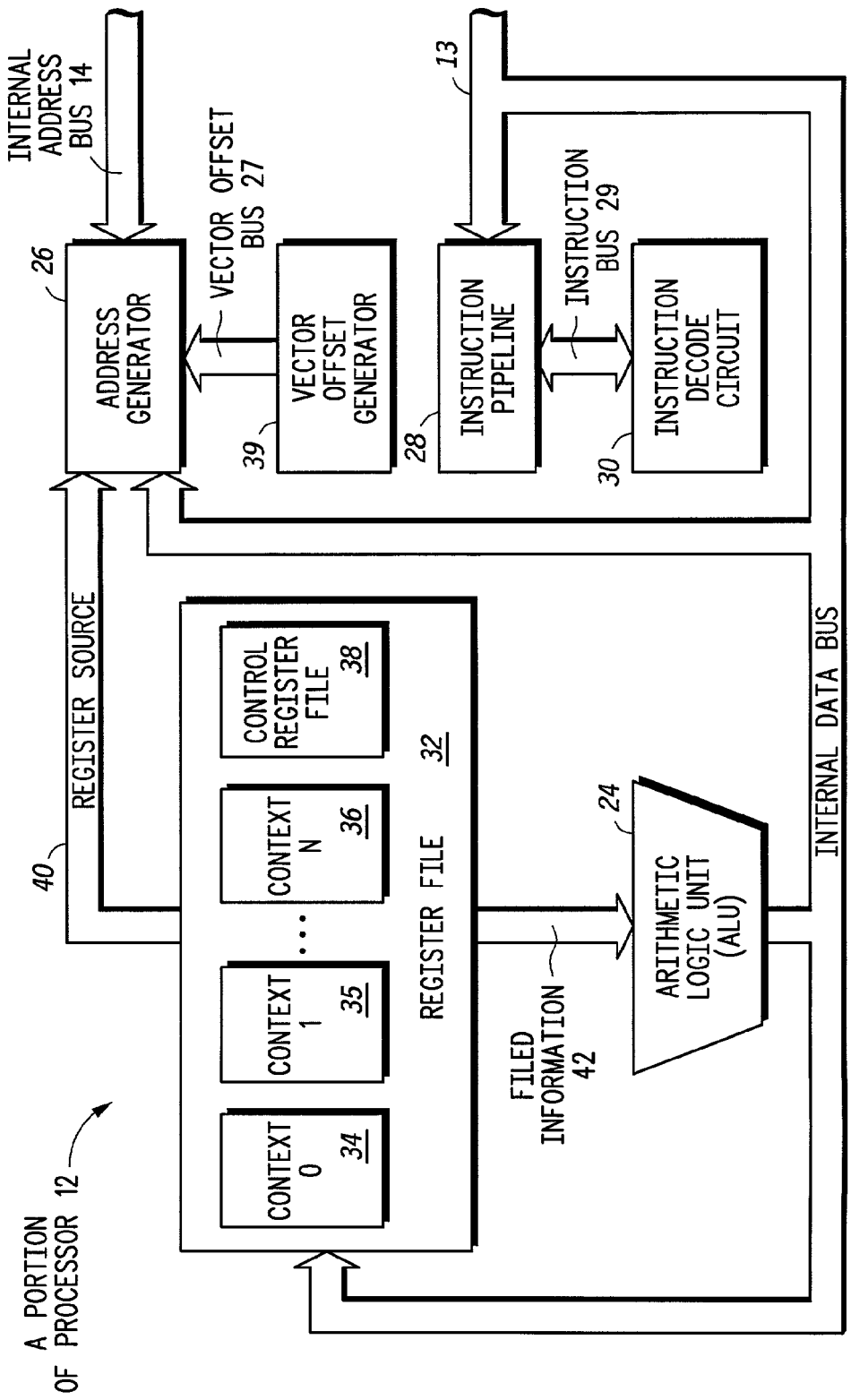
FIG. 2 illustrates, in block diagram form, a processor in accordance with one embodiment of the present invention.

FIG. 2 illustrates a portion of processor 12 in accordance with one embodiment of the present invention. Processor 12 includes an arithmetic logic unit (ALU) 24, an address generator 26, an instruction pipeline 28, an instruction decode circuit 30, a register file set 32, and a vector offset generator 39. Register file 32 includes multiple register contexts, such as context 0 34, context 1 35 and context N 36. Therefore, register file 32 includes N+1 registers contexts, and although only 3 are illustrated in FIG. 2, processor 12 may include any number of register contexts, depending on how many register contexts the hardware can support. Register file 32 also includes a control register file 38. Internal address bus 14 is coupled to address generator 26, and address generator 26 is coupled to register file 32 via a register source bus 40 and is also coupled to internal data bus 13. Vector offset generator 39 is coupled to address generator 26 via a vector offset bus 27. Internal data bus 13 is coupled to instruction pipeline 28, ALU 24, and register file 32. Instruction decode circuit 30 is bi-directionally coupled to instruction pipeline 28 via an instruction bus 29. Register file 32 is coupled to ALU 24 via a filed information bus 42.

Figure 3:
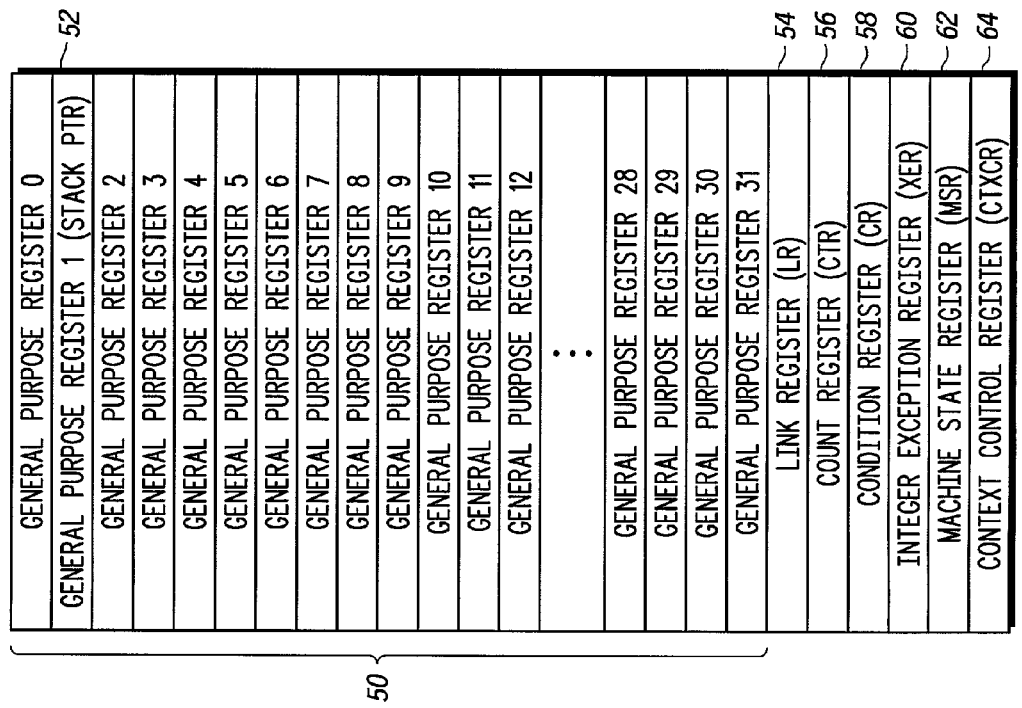
FIG. 3 illustrates a register context in accordance with one embodiment of the present invention.

FIG. 3 illustrates a register context 51 according to one embodiment of the present invention. Register context 51 of FIG. 3 may represent any one of contexts 0 through N of FIG. 2. In the embodiment of FIG. 3, register context 51 includes 32 general purpose registers (GPR) 50, a link register 54, a count register 56, a condition register 58, an integer exception register 60, a machine state register 62, and a context control register 64. Link register 54 is used to hold subroutine linkage information when calling and returning from a subroutine. Count register 56 is used to hold count information for processing counted loops of instructions. Condition register 58 is used to hold the results of condition code calculations. Integer exception register 60 is used to provide various exception status. Machine state register 62 is used to control and provide status of various functions within processor 12. Context control register 64, as will be discussed in more detail below, is used to provide for context switching in accordance with one embodiment of the present invention. Note also that one of the GPR 50 is a stack pointer register 52 which is reserved for storing the current stack pointer.

Therefore, a register context refers to the contents of the registers described above (the registers of context 51). Alternate embodiments may define a register context as having all or some of the same registers of register context 51, or may include a different set of registers from those of register context 51. Therefore, as used herein, a register context can be defined to have any number and any type of registers. Typically, a register context contains register resources that form all or a portion of a programmers' register model for a processor. During normal operation or upon power up or reset, data processing system 10 may default to utilizing context 0 34. (Note that in alternate embodiments, normal operation may default to a different context.) However, when an interrupt or process switch occurs, so as not to corrupt the values in context 0 34, data processing system 10 selects a new context (from context 1 to N) for processing the interrupt or executing the new process or thread. Therefore, interrupt handling and process switching (e.g. multithreading) may result in a need for register context switching within data processing system 10. Also, in some embodiments, it may be desirable to share a portion of the registers within a register context with another register context. Therefore, as will be described below, portions of a register context may be mapped into another register context to help reduce overhead and increase the speed during a context switch.

In data processing system 10, exceptions and interrupts are recognized at a decode stage or an execution stage of instruction pipeline 28. Thus, when an instruction is provided to instruction decode circuit 30 and decoded, an interrupt may be recognized and processed, in lieu of normal instruction processing. In one embodiment described herein, there are multiple interrupt levels which determine whether a given interrupt has priority over any other interrupt. Thus, and interrupt with a high priority will get processed more quickly than an interrupt with a lower priority, which must wait for processing. Each interrupt or type of interrupt or interrupt having a same priority may therefore share a same register context if desired.

When an interrupt is received, data processing system 10 begins to execute an exception processing sequence. During this sequence, vector offset generator 39 provides a vector offset value via vector offset bus 27 to address generator 26. Address generator 26 uses the vector offset value to form an instruction address at which execution is to begin for processing the interrupt. In one embodiment, in addition to the vector offset value, vector offset generator also provides a context selector indicating the register context to be used for the interrupt processing. In one embodiment, the context selector is a part of the vector offset value, or may be a separate value provided by vector offset generator 39. Also, the context selector can be provided directly to register file 32. In alternate embodiments, the context selector can be a value read from a memory (not illustrated) or may be received via an instruction. In the case of data processing system 10 having 8 register contexts in register file 32, the context selector may be a 3-bit value used to identify one of the register contexts.

Also, data processing system 10 may be capable of process switching where processor 12 is capable of switching from one process to another, where each process may operate in a different register context. For example, in a multi-threading application, processor 12 may continually switch among various processing threads, where different processing threads (or groups of processing threads) use a different register context. In the case of process switching, an interrupt may be used to indicate a process switch to data processing system 10 (where the interrupt handling includes switching processes). Alternatively, other methods may be used to indicate to address generator 26 that a process switch is necessary such that address generator 26 can generate a starting address for the new process. Also, upon a process switch, a context selector is also provided to indicate which register context is needed for the new process. As described above, the context selector can be provided in a variety of different ways (i.e. from vector offset generator 39, from a memory, from a user instruction, etc.) and can be provided directly or indirectly (e.g. via address generator 26) to register file 32 such that the correct register context can be selected.

Once a register context has been established, instructions executed by processor 12 will reference the appropriate general purpose registers (GPRs 50) or special purpose registers (e.g. LR 54, CTR 56, CR 58, XER 60, MSR 62, or CTXCR 64) corresponding to the currently established context. Registers within other contexts will not be affected (unless a mapping has been established as will be described below), thus no saving or restoring of alternate contexts to memory need be performed prior to execution of instructions for the currently established context. This provides for a savings in overhead.

Figure 4:
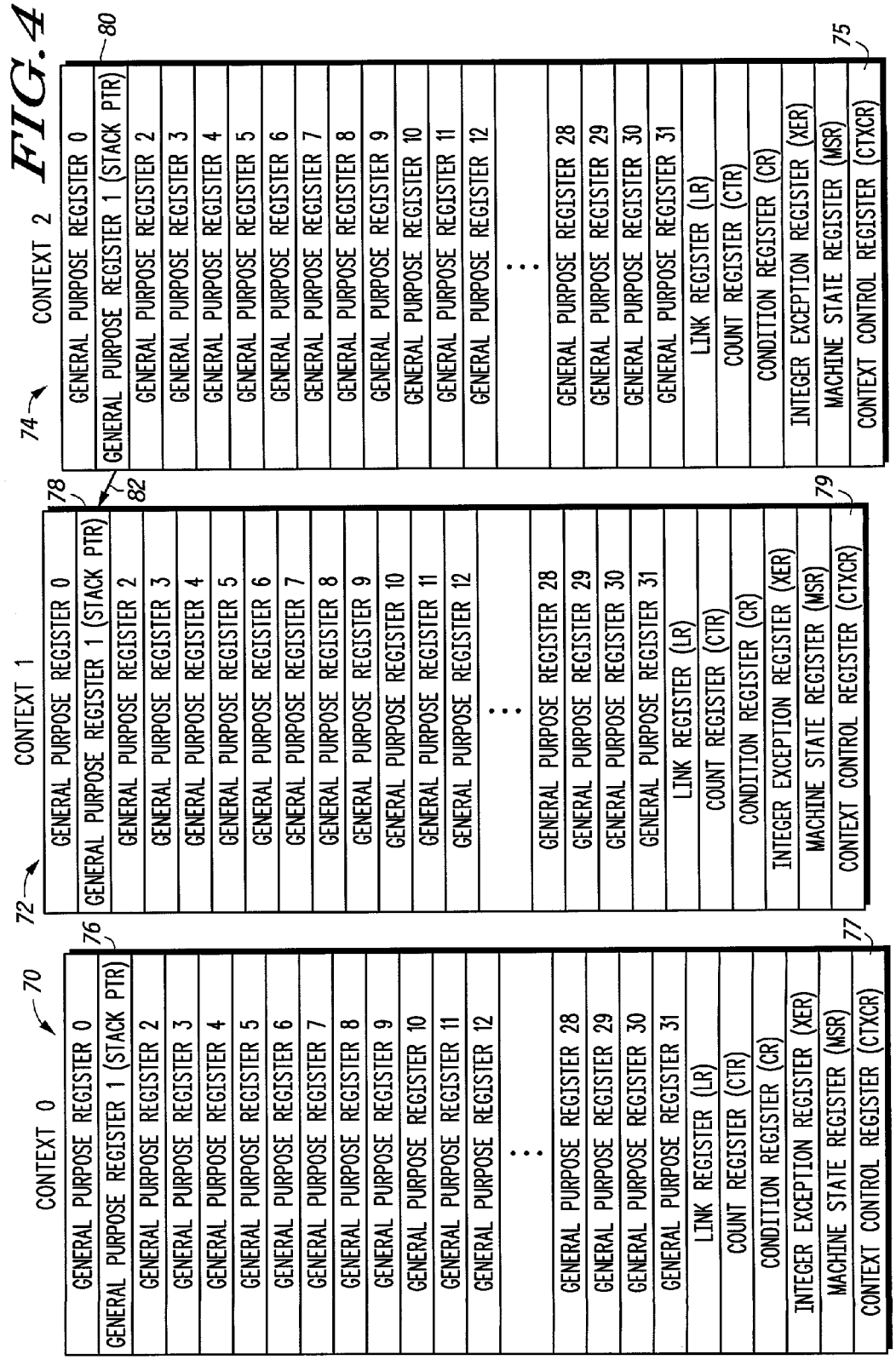
FIGS. 4 and 5 illustrate example mappings within register contexts, in accordance with various embodiments of the present invention.
Figure 5:
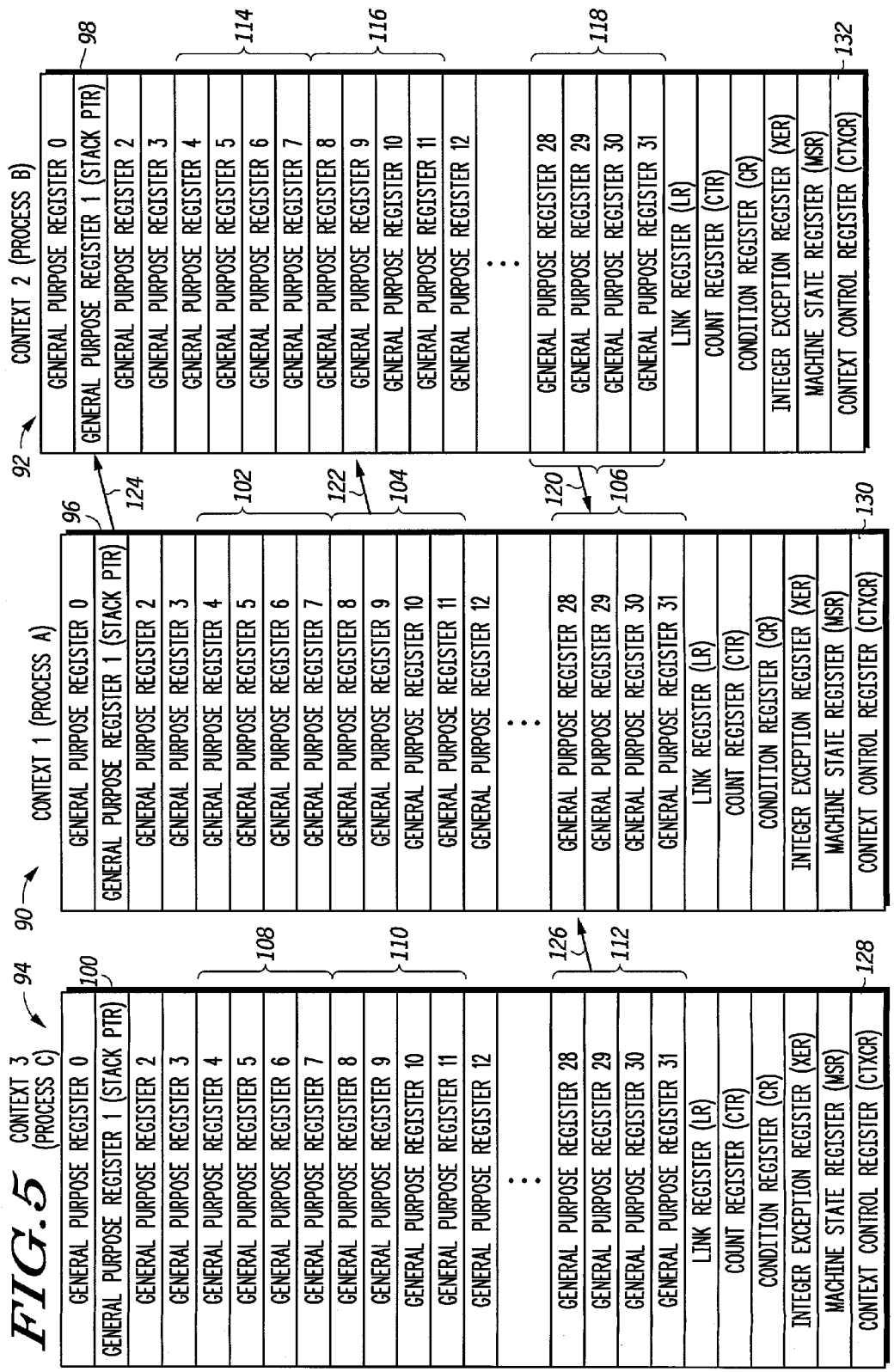

FIGS. 4 and 5 illustrate example mappings within register contexts that may be used within data processing system 10. FIG. 4 illustrates three register contexts: context 0 70, context 1 72, and context 2 74. These register contexts may represent three of the contexts within contexts 0 through N of FIG. 2. Assume that in the example of FIG. 4, context 0 70 corresponds to normal operation of data processing system 10, context 1 72 corresponds to a critical interrupt (highest priority), and context 2 corresponds to an external interrupt (lower priority). As mentioned above, in some cases it is desirable for multiple register contexts to "share" a portion of the registers. Therefore, in the example of FIG. 4, as indicated by arrow 82, stack pointer register 80 of register context 2 74 is mapped to stack pointer 78 of register context 1 72 indicating that register context 1 72 and register context 2 74 are able to share a same stack pointer such that the same stack pointer value is used in both register contexts. This mapping reduces overhead and helps maintain coherency of the stack pointer. Therefore, upon processing an external interrupt, context 2 74 is selected by data processing system 10. However, since stack pointer register 80 is mapped to stack pointer register 78, stack pointer register 78 in register context 1 72 is accessed during operation in register context 2 74 in order to access the stack pointer. In other words, while operating with a current context value selecting register context 2 74, instructions and other operations which attempt to access stack pointer register 80 are redirected to access stack pointer register 78 within register context 1 72. This allows a single consistent stack and stack pointer value to be shared between context 1 and context 2, without the overhead of synchronizing separate stack pointer registers 80 and 78.

Note that stack pointer register 76 (of context 0 70) and stack pointer register 78 (of context 1 72) are not mapped; therefore, when operating in these register contexts, no other register contexts need to be accessed when accessing the stack pointer. Context control registers 77, 79, and 75 within each of register contexts 70, 72, and 74, respectively, indicate whether the stack pointer of the corresponding register context is mapped, and if so, to which other register context it is mapped to. The details of the context control register will be discussed in more detail below in reference to FIG. 6.

FIG. 5 illustrates three register contexts in accordance with another example: register context 1 90, register context 2 92, and register context 3 94. As with FIG. 4, the register contexts of FIG. 5 may represent three of the register contexts of register contexts 0 through N of FIG. 2. In the example of FIG. 5, register context 1 90 corresponds to Process A, register context 2 92 corresponds to Process B, and register context 3 94 corresponds to Process C. Therefore, when data processing system 10 is executing Process A, data processing system 10 operates in register context 1 90. Upon a process switch (such as from Process A to Process B), the context selector selects register context 2 92 for use when executing Process B. As described above in reference to FIG. 4, each of the stack pointer registers have the capability of being mapped to a different register context. For example, in FIG. 5, stack pointer register 96 of register context 1 90 is mapped to stack pointer register 98 of register context 2 92 as indicated by arrow 124. Therefore, when executing Process A (using register context 1 90), an access to the stack pointer actually results in an access to stack pointer register 98 within a different register context (i.e. register context 2 92). Note that stack pointer register 100 of register context 3 94, though, is not mapped. Also, in one embodiment, it is possible to have layered mappings. For example, just as stack pointer register 96 is mapped to stack pointer register 98, stack pointer register 98 can also be mapped to, for example, stack pointer register 100. Also, a particular stack pointer register can have multiple stack pointer registers mapped to it. For example, both stack pointer registers 100 and 96 could be mapped to stack pointer register 98. Other mappings are possible as well.

The register contexts of FIG. 5 also include groupings of registers. For example, the general purpose registers are grouped into groups of four registers. In register context 1 90, GPR 4–7 are grouped together into register group 102, GPR 8–11 are grouped together into register group 104, and GPR 28–31 are grouped into register group 106. Therefore, register context 1 90, in the example of FIG. 5, includes three groups (groups 102, 104, and 106) of four registers each, where each of these groups can be mapped (as a group) to a different register context. In alternate embodiments, any number and type of registers may be grouped. Alternatively, each individual register may be considered a separate group, depending on the granularity desired. Similarly, register context 2 92 includes three groups of four registers: group 114 having GPR 4–7, group 116 having GPR 8–11, and group 118, having GPR 28–31). Also, register context 3 94 includes three groups of four registers: group 108 having GPR 4–7, group 110 having GPR 8–11, and group 112, having GPR 28–31). These groupings allow for groups of registers to be mapped among different register contexts.

For example, as illustrated by arrow 120, group 118 of register context 2 92 is mapped to group 106 of register context 1 90. As shown by arrow 126, group 112 of register context 3 94 is also mapped to group 106 of register context 1 90. That is, the registers of group 106 are shared by all three register contexts: register context 1 90, register context 2 92, and register context 3 94. Therefore, when executing either Process B or Process C, an access to GPR 28–31 of the current register context (register context 2 92 or register context 3 94, respectively) actually results in an access to GPR 28–31 of register context 1 90. Also illustrated in FIG. 5, as shown by arrow 122, group 104 of register context 1 90 is mapped to group 116 of register context 2 92. That is, the registers of group 116 are shared by both register context 1 90 and register context 2 92. Therefore, when executing Process A, an access to GPR 8–11 of the current register context actually results in an access to GPR 8–11 of register context 2 92. Therefore, any number of mappings may exist, whether it be of a single register (such as stack pointer register 96, 98, or 100) or groups of registers. Also, each register context may have some registers mapped to one register context and other registers mapped to another register contexts. Also, a register or group of registers may have registers of multiple register contexts mapped to it.

Figure 6:
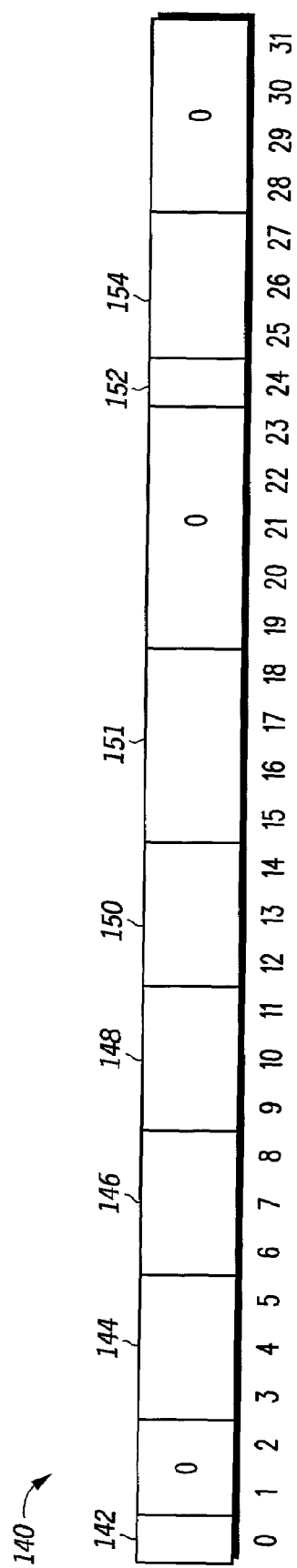
FIG. 6 illustrates a context control register in accordance with one embodiment of the present invention.

The mappings of each register context is defined in the context control register of each register context (for example, context control registers 128, 130, and 132 of FIG. 5). Therefore, each register context 0–N of FIG. 2 has a corresponding context control register which may be included in each register context (as in FIGS. 4 and 5) or may be stored separately (such as in control register file 38 of FIG. 2). FIG. 6 illustrates the contents of a context control register 140 in accordance with one embodiment of the present invention. Context control register 140 may refer to context control registers 77, 79, 75 of FIG. 4, or context control registers 128, 130, and 132 of FIG. 5. In one embodiment, context control register 140 is a special purpose 32 bit register that has various different fields which controls the mappings of registers, and holds current, alternate, and saved context information.

Bit 0 of context control register 140 corresponds to a context enable field 142 which enables the use of multiple register contexts. For example, if context enable field 142 is negated, only a single context is enabled, all other control fields in context control 140 are ignored, and the current context is set to the default register context (which, in the embodiment illustrated in FIG. 2, is register context 0 34). If the context enable field 142 is asserted, then multiple contexts are enabled. Bits 3–5 correspond to a number of contexts field 144 which is a read only field that indicates the highest context number supported by the hardware. In the example of FIG. 6, a value of 000 indicates one context is support while a value of 111 indicates that eight register contexts are supported by the hardware. If data processing system 10 can support more than 8 register contexts, then additional bits can be used for the number of contexts field 144. However, in the embodiment of FIG. 6, it will be assumed that a maximum of 8 register contexts is supported.

Bits 6–8 correspond to a current context field 146 which defines the currently enabled register context. In one embodiment, this field is cleared to 0 upon reset to indicate that the default register context is register context 0. The current context field 146 corresponds to the context selector discussed above which may be provided in a variety of different ways, such as by vector offset generator 39 of FIG. 2. Therefore, upon a context switch (caused by an interrupt or process switch), the current context field 146 is set to the new register context as indicated by the context selector. For example, referring to FIG. 5, if data processing system 10 is currently executing in Process A, then, upon a context switch to Process B, the context selector indicates register context 2, and a value of 2 gets written into the current context field of the context control register of register context 2 92.

Note that while each register context has its own context control register, some of the fields may be shared among the different context control registers. For example, a single context enable bit, a single number of contexts field, and a single current context field may be implemented which is used by all the context control registers since the value is always the same among the different context control registers. Alternate embodiments may use a context enable or a number of contexts field or a current context field for each context control register, but by using a single shared field for each reduces hardware requirements.

Bits 9–11 correspond to a saved context field 148 which defines the previously enabled context. Note that this field can also be cleared to 0 upon reset. Therefore, in the above example of switching from Process A to Process B (referring to FIG. 5), the current context field is set to 2 (representing register context 2 92) and the saved context field gets set to 1 (representing the previous context, register context 1 90).

Bits 12–14 correspond to the alternate context field 150 which defines an alternately enabled context which is used to define a context mapping for register groups. Bits 15–18 correspond to mapping fields 151. Bit 15 corresponds to a register group A (defined as GPR 4–7), bit 16 to corresponds to register group B (defined as GPR 8–11), bit 17 to register group C (defined as GPR 16–23), and bit 18 to register group D (defined as GPR 27–31). Each of the register groups A–D can be independently enabled by asserting the corresponding bit. For example, if bit 15 is asserted, group A is enabled such that group A is mapped to the register context defined by the alternate context field. If bit 15 is negated, group A is not mapped. Similarly, if bits 16, 17, or 18 are asserted, then the corresponding group of registers (B, C, or D, respectively) is mapped to the register context defined by the alternate context field. If bits 16, 17, or 18 are negated, then the corresponding group of registers (B, C, or D, respectively), are not mapped. Therefore, referring to FIG. 5, the context control register of register context 1 90 includes a 2 in its alternate context field indicating that the selected group or groups of registers are mapped to register context 2 92. Also, bit 16 (corresponding to group B having GPR 8–11) is asserted such that group 104 of register context 1 90 is mapped to group 116 of register context 2 92.

In the example context control register, context control register 140, of FIG. 6, a single alternate context field is available and each group (A–D) can be enabled to be mapped to a same alternate register context. That is, if group A is mapped to a particular register context, then groups C–D can only be mapped to the same context. However, in alternate embodiments, each separate grouping of registers (such as groups A–D) can have a corresponding alternate context field such that they can be mapped to different alternate register contexts. Alternatively, a separate alternate context field can be used for groups of groups (e.g. one alternate context field for groups A and B and another for groups C and D). Also, the groups can be defined in any way. For example, each group can have more than or less than four registers, each group can be a single register, or each group can have a different number of registers. Also, in alternate embodiments, more or less groups may be used with more or less alternate context fields. Therefore context control register 140 of FIG. 6 is only one example. Also, each field may use more or less bits, as needed, to represent the values of the fields. Context control 140 includes unused bits 1, 2, 19–23, and 28–31; however, alternate embodiments may not include any unused bits or may require multiple registers for storing the context control information.

Bit 24 of context control register 140 corresponds to a stack pointer context enable field 152 which enables mapping of the stack pointer, as discussed in reference to both FIGS. 4 and 5. Bits 25–27 correspond to a stack pointer context select field 154 which selects an alternate register context for the stack pointer. Therefore, if bit 24 is asserted, the stack pointer is mapped to the register context indicated by the stack pointer context select field 154; however, if negated, then the stack pointer is not mapped (i.e. it remains from the current context defined by the current context field 146). The stack pointer context select field 154 is a 3 bit value which can indicate which of the 8 register contexts in data processing system 10 is to be used as the alternate context for the stack pointer. For example, a value of 000 may correspond to register context 0 and 111 to register context 7. Therefore, if the stack pointer context select field 154 is set to 001, (and stack pointer context enable field 152 is asserted) then the stack pointer of the current context is mapped to register context 1. For example, referring back to FIG. 4, the stack pointer context enable field of the context control register of register context 2 74 is asserted and the stack pointer context select field is set to 001 to indicate that the stack pointer register 80 is mapped to stack pointer register 78 of register context 1 72. Note also that alternate embodiments may include fields which allow the mapping of other individual registers other than just allowing the sharing of the stack pointer.

The context control register can be programmed in a variety of different ways. For example, in one embodiment, each context control register can be user programmed directly. Alternatively, the context control registers can be mapped indirectly using the alternate context field of the current context control register. For example, in one embodiment, upon power up or reset, data processing system defaults to register context 0. The alternate context field can then be set to a value indicating which register context's context control register is to be programmed. For example, while in register context 0, a writing of a value of 2 to the alternate context field of the context control register of register context 0 allows access to the programming of the context control register of register context 2 via a special purpose register. After all of the context control fields have been programmed, they can all be enabled simultaneously (which, in the case of having a single shared context enable field is done by asserting this bit). Also, in one embodiment, interrupt processing may be turned off during the programming of context control registers.

Note that context control register 140 has been described in reference to particular fields and bit locations. Note that alternate embodiments may include more or less fields, as needed, and each field may include more or less bits, as needed. Also, in alternate embodiments, context control registers may be located anywhere within data processing system 10, or may be located external to data processing system 10.

Therefore, it can be appreciated how the context control register can be used to provide for flexible context selection with reduced overhead. Upon a context switch within data processing system 10, the context control register of the new register context is updated. For example, the new register context is written to the current context field, the previous context gets written to the saved context field, and the register mappings provided within the mapping fields are used when operating within the new register context. The register mappings allow for different register contexts to share register values. Also, the register mappings allow for access of other register contexts outside the current register context, as defined by the context control register of the current register context. Also, the user programmable context control registers allow for flexibility in how the mappings are defined. Therefore, one aspect of the present invention described herein provides a flexible mechanism to map portions of an alternate register context onto a current register context (and vice versa) and provides for flexible sharing of common stack pointers among multiple contexts, thus resulting in improved real-time performance. By mapping portions of the current context onto an alternate context, the overhead of transferring information values between operating contexts can be removed or eliminated, resulting in improved performance and flexibility.

In the foregoing specification, the invention has been described with reference to specific embodiments. However, one of ordinary skill in the art appreciates that various modifications and changes can be made without departing from the scope of the present invention as set forth in the claims below. For example, the block diagrams may have different blocks than those illustrated and may have more or less blocks or be arranged differently. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A data processing system comprising:
a plurality of register contexts;
storage circuitry for storing context control information corresponding to at least a portion of the plurality of register contexts, wherein the storage circuitry comprises a plurality of context control registers, wherein each of the plurality of register contexts comprises a corresponding context control register; and
processing circuitry for selectively accessing a portion of an alternate register context within the plurality of register contexts in place of a corresponding portion of a current register context within the plurality of register contexts, wherein the alternate register context and the portion of the alternate register context are indicated by the context control register corresponding to the current register context; and wherein the context control register corresponding to the current register context comprises a mapping field to identify the portion of the alternate register context and an alternate context field to identify the alternate register context.

2. The data processing system of claim 1, wherein the portion of the alternate register context comprises a stack pointer.

3. The data processing system of claim 1, wherein the portion of the alternate register context comprises a set of registers.

4. The data processing system of claim 3, wherein the set of registers comprises a plurality of general purpose registers.

5. The data processing system of claim 1, wherein the context control information comprises an enable field wherein, when the enable field is asserted, the processing circuitry accesses the portion of the alternate register context.

6. The data processing system of claim 5, wherein the context control information comprises a previous context field to identify a previous register context within the plurality of register contexts that was executing previous to the current context register.

7. In a data processing system having a plurality of register contexts, a method comprising:
operating in a first register context within the plurality of register contexts, each of the plurality of register contexts having corresponding context control information, wherein operating in the first register context comprises:
accessing a first portion of the first register context;
selectively accessing a portion of a second register context corresponding to a second portion of the first register context based on the corresponding context control information of the first register context, wherein the corresponding context control information of the first register context identifies the second register context and the portion of the second register context; and wherein each of the corresponding context control information comprises a mapping field to identify the portion of the second register context and an alternate context field to identify the second register context.

8. The method of claim 7, wherein the portion of the second register context comprises a stack pointer.

9. The method of claim 7, wherein the portion of the second register context comprises a set of registers.

10. The method of claim 9, wherein the set of registers comprises a plurality of general purpose registers.

11. The method of claim 8, wherein the context control information comprises an enable field wherein, when the enable field is asserted, the method comprises accessing the portion of the second register context corresponding to the second portion of the first register context.

12. The method of claim 8, further comprising:
receiving a context selector;
operating in the second register context based on the context selector; and
selectively accessing a portion of a third register context corresponding to a second portion of the second register context based on corresponding context control information of the second register context.

13. The method of claim 12, further comprising:
storing a current context into the corresponding context control information of the second register context, the current context corresponding to the second register context; and
storing control information of a saved context into the corresponding context control information of the second register context, the saved context control information corresponding to the first register context.

14. The method of claim 12, wherein the context selector is received in response to one of an interrupt or a process switch in the data processing system.

15. A data processing system comprising:
a plurality of register contexts, wherein each register context comprises a corresponding context control register having an alternate register context field and a mapping field; and
processing means for selectively accessing a portion of an alternate register context within the plurality of register contexts in place of accessing a corresponding portion of a current register context within the plurality of register contexts, wherein the portion of the alternate register context is defined by the mapping field in the context control register corresponding to the current register context and the alternate register context is defined by the alternate register context field in the context control register corresponding to the current register context.

16. The data processing system of claim 15, wherein the context control registers are user programmable.

17. The data processing system of claim 15, wherein the portion of the alternate register context comprises a stack pointer.

18. The data processing system of claim 15, wherein the portion of the alternate register context comprises a set of registers.

19. The data processing system of claim 15, further comprising a control register file for storing the context control registers.

20. The data processing system of claim 1, wherein each of the plurality of context control registers comprises an alternate context field to identify an alternate register context and a mapping field to identify a portion of the alternate register context.

21. The method of claim 8, wherein the corresponding context information of each of the plurality of register contexts includes an alternate context field to identify an alternate context of the plurality of registers contexts and a mapping field to identify a portion of the alternate context identified by the alternate context field.

* * * * *